(12) United States Patent
Brader-Araje et al.

(10) Patent No.: US 7,289,967 B1
(45) Date of Patent: Oct. 30, 2007

(54) METHODS OF UPDATING INFORMATION MAINTAINED AT AN INTERMEDIARY WEB SITE

(75) Inventors: Michael Brader-Araje, Durham, NC (US); Dov Cohn, Raleigh, NC (US); Mark Jauquet, Amherst, NY (US); Richard Racz, Richmond, VA (US); John L. Root, III, Cary, NC (US)

(73) Assignee: Siebel Systems, Inc., Emeryville, CA (US)

( * ) Notice: Subject to any disclaimer, the term of this patent is extended or adjusted under 35 U.S.C. 154(b) by 0 days.

(21) Appl. No.: 09/549,370

(22) Filed: Apr. 13, 2000

(51) Int. Cl.
*G06Q 30/00* (2006.01)
(52) U.S. Cl. .................................................... 705/26
(58) Field of Classification Search ............... 705/26, 705/27, 37, 10
See application file for complete search history.

(56) References Cited

U.S. PATENT DOCUMENTS

| | | | |
|---|---|---|---|
| 5,898,836 A * | 4/1999 | Freivald et al. ............. 709/218 |
| 5,913,215 A * | 6/1999 | Rubinstein et al. ........... 707/10 |
| 5,978,842 A * | 11/1999 | Noble et al. ................ 709/218 |
| 6,405,175 B1 * | 6/2002 | Ng .............................. 705/14 |
| 6,415,270 B1 * | 7/2002 | Rackson et al. ............. 705/37 |
| 6,425,270 B1 * | 7/2002 | Suzuki et al. ................ 65/379 |
| 6,549,904 B1 * | 4/2003 | Ortega et al. ................ 707/10 |
| 6,892,186 B1 * | 5/2005 | Preist .......................... 705/37 |
| 7,047,210 B1 * | 5/2006 | Srinivasan ................... 705/26 |

FOREIGN PATENT DOCUMENTS

JP          410198614 A    *  7/1998

OTHER PUBLICATIONS

Anonymous. "Redherring.com touse change detection solution." Jun. 1999. Information Today Medford: vol. 16. Iss. 6. (2 pages).*
www.netmind.com (cited from Dec. 12, 1998). (5 pages).*
An infrastructure for meta-auctions, Bornhovd, C, Jun. 8-9, discloses an infrastructure for meta-auctions.*

* cited by examiner

*Primary Examiner*—Matthew S. Gart
(74) *Attorney, Agent, or Firm*—Myers Bigel Sibley & Sajovec, P.A.

(57) ABSTRACT

Systems, methods and computer program products are provided that can allow users to obtain information about, and participate in, auctions being conducted at a plurality of on-line auction sites. A Web site of an intermediary maintains information about items being auctioned at a plurality of remotely located auction sites in communication with a computer network, such as the Internet. Auction information is displayable to users accessing the intermediary web site via clients, such as Web browsers, via the computer network. Potential buyers accessing an intermediary Web site can search for and place bids for items being auctioned at remote, on-line auctions. In addition, sellers can utilize an intermediary Web site to locate on-line auctions within which to list items for sale.

7 Claims, 12 Drawing Sheets

auction info

Seller's Assistant Results

Item Category: Antiques & Collectibles  <<Change
Item Keyword(s): stamps sites we index sellers assistant

[Sell Here] clickabid [Rate]  _582_
1 User Rating: ⭐⭐⭐⭐⭐  _584_
clickabid.com is your Canadian online auction community. Bid, buy, sell and collect. They have a wide selection of categories and lots of items including a wide assortment of beenie babies and pokemon cards.
[21 similar items]

security

[Sell Here] Awardmasters Philatelics [Rate]
Awardmasters Philatelics is the site for classic stamps of the world. United States, Great Britain and Commonwealth, Canada and Provinces, Europe, Asia, Africa, South and Central America. Register free. Satisfaction guaranteed.
15 similar items escrow services

[Sell Here] FDCAuctionCentral [Rate]
Avg of 2 User Ratings: ⭐⭐⭐⭐⭐
FDCAuctionCentral is a live ("24/7"), real-time dynamic internet cover auction that includes individual items, as well as collections/accumulations. They invite you to jump in, browse or search for items that meet your collecting needs, and enjoy the bidding experience with your fellow collectors.
1 similar item auction express™ desktop
auctionwatch® desktop

[Sell Here] 3D Auction [Rate]
Avg of 2 User Ratings: ⭐⭐⭐⭐⭐

_580_

_1000_

METHODS OF UPDATING INFORMATION MAINTAINED AT AN INTERMEDIARY WEB SITE

FIELD OF THE INVENTION

The present invention relates generally to electronic commerce and, more particularly, to auctions conducted via a computer network, such as the Internet.

BACKGROUND OF THE INVENTION

Hundreds of auction sites are currently accessible via the Internet, with more coming on-line everyday. Many types of products and services are bought and sold via these on-line auction sites. For example eBay and Auction.com allow visitors to participate in auctions for items in various categories, including collectibles, antiques, sports memorabilia, jewelry, and the like. OnSale and uBid allow visitors to participate in auctions for computer products, sports and fitness equipment, electronics equipment, travel packages, and the like.

In addition, some enterprises offer their own products and services for sale through auctions conducted on their own Web sites. For example, The Sharper Image (650 Davis Street, San Francisco, Calif.) conducts auctions on their web site allow consumers to bid on products offered for sale by The Sharper Image. Winning bids may be treated like normal purchase transactions between buyers and The Sharper Image, similar to buying from The Sharper Image store, catalog, or Internet store.

Because of the proliferation of on-line auction sites, identical items may be offered for sale at more than one auction site. For example, a consumer interested in purchasing a particular model of Nikon® brand binoculars may find the particular model of binoculars offered for sale on the eBay auction site, on the uBid auction site, as well as on the auction sites of various retailers. To obtain the best "deal", the consumer may be required to visit each of these auction sites periodically to monitor an ongoing auction.

Some auction sites may require pre-registration of buyers and sellers. Consumers wishing to view items currently being auctioned, to bid on an item, or to offer an item for sale, may have to enter a user identification and password to gain entry. As such, accessing multiple auction sites to monitor various auctions may become burdensome, particularly if a consumer is required to enter passwords and user identifications each time.

Accordingly, it would be desirable for consumers to be able to search multiple auction sites easily for information relating to items being auctioned without being required to visit each auction site. Various Web sites have emerged recently which attempt to "aggregate" or collect auction information from multiple auction sites and present the data to consumers. For example, BidFind utilizes a "bot" or "crawler" that visits multiple on-line auction sites to collect data associated with various items offered for sale at each auction site. This auction item data is conventionally collected by parsing the Hypertext Markup Language (HTML) code of various web pages at an auction site and extracting data related to auction items from the HTML code.

Unfortunately, conventional methods of parsing HTML code, and extracting auction item data therefrom, may be inaccurate and inefficient. A conventional crawler typically parses HTML code line-by-line in a sequential manner. For large Web sites having many web pages and many lines of HTML code, parsing via a conventional crawler may be time consuming, as well. Furthermore, crawlers may not be able to accurately distinguish between auction item data and other data within HTML code, especially since auction site owners are able to change the position and format of auction item data on their Web pages. Accordingly, some auction item data may be incorrect and some may be missing. In addition, there may be a time lag between when a crawler parses HTML code at a particular web site and when the extracted auction item data is available to consumers at an auction search site. As such, auction data obtained via conventional crawler methods may not be timely and, consequently, may be of lesser value to consumers.

As such, it would be desirable to be able to search many different auction sites for auction item data and to present this data to consumers, quickly, accurately and efficiently. From a buyer's standpoint, it would be desirable to quickly locate auction sites having particular items offered for sale. From a seller's standpoint, it would be desirable to quickly locate the best auction sites through which to offer products/services for sale.

SUMMARY OF THE INVENTION

In view of the above discussion, the present invention provides systems, methods, and computer program products that can allow users to obtain information about, and participate in, auctions being conducted at a plurality of on-line auction sites. According to one embodiment of the present invention, a Web site of an intermediary maintains information about items being auctioned at a plurality of remotely located auction sites that are in communication with a computer network, such as the Internet. Auction information is displayable to users accessing the intermediary Web site via clients, such as Web browsers.

Auction information maintained by the intermediary Web site is kept current or "fresh" by obtaining auction item data at predetermined time intervals that has changed since a previous time for auctions currently being conducted at the respective auction sites. Keywords are extracted from auction item data received by the intermediary Web site and stored in a format that is searchable by users accessing the intermediary web site. Each keyword extracted from auction item data is preferably associated with an item currently being auctioned at a respective one of the plurality of remote, on-line auction sites.

According to a preferred embodiment of the present invention each remote, on-line auction site includes a data engine that is configured to obtain data about each item currently being auctioned at the respective auction site and to communicate with an agent running at the intermediary Web site. The intermediary web site agent is configured to establish a TCP/IP connection with each respective data engine and to send an HTTP request to each respective data engine, via the TCP/IP connection, for updated auction item information.

A data engine at each auction site preferably includes a data file that is configured to store cyclic redundancy checking (CRC) values for each item being auctioned at the respective auction site. Preferably, a CRC value for "static" information (i.e., auction item data that generally does not change with time) and a CRC value for "dynamic" information (i.e., auction item data that may change with time) is stored for each auction item in a data file. When requested by the agent, or at other predetermined time intervals, a respective data engine determines whether a data file contains a CRC value for each item currently being auctioned at the respective auction site. The data engine stores CRC values for static and dynamic information in the data file for each item currently being auctioned that does not have CRC values in the data file. For these "new" auction items, the data engine sends the actual static and dynamic information to the intermediary Web site.

In addition, the data engine at each remote auction site also generates new CRC values and compares these new values with stored CRC values to determine if auction item information has changed. Exemplary static information includes, but is not limited to, auction item titles and auction item descriptions. Exemplary dynamic information includes, but is not limited to, bid information (e.g., number of bids, high bid, etc.) and price information associated with an auction item. If it is determined that there has been a change in dynamic and/or static information, current dynamic and/or static information is sent to the intermediary Web site.

An intermediary Web site, according to another embodiment of the present invention, is configured to retrieve and display information about items being auctioned at a plurality of remote, on-line auctions. In response to receiving a user request for information about items currently being auctioned at one or more of the remote, on-line auction sites, keywords maintained by an intermediary Web site are searched for matches with one or more keywords contained in a user request. Each keyword maintained by the intermediary Web site is associated with an item currently being auctioned at a respective one of the plurality of remotely located auction sites. Accordingly, in response to locating a keyword that matches a user request keyword, the intermediary Web site can display information about items currently being auctioned at respective ones of the plurality of remote, on-line auction sites. Preferably, the displayed information includes an identification of each auction item and a hypertext link to the respective auction site where the item is being auctioned.

In addition, keyword searches can be performed using various auction item parameters including, but not limited to, price ranges, time periods, and types of auction or sales. Furthermore, search results can be formatted in various ways. For example, search results can be sorted by auction ending date, auction starting date, bid, quantity, item name, and auction site, and in ascending or descending order.

According to another embodiment of the present invention, a user can choose to receive updated information about selected auction items at one or more future times. Preferably, an e-mail message containing updated information is sent to the user on a daily (or other) basis. Accordingly, a user can remain informed about the status of one or more auction items without having to visit either the intermediary Web site or a remote, on-line auction site. In addition, users who request a search for auction items can have the search performed at various times in the future. Results from these future searches can be forwarded to the user via e-mail or other communications methods.

According to another embodiment of the present invention, users can directly participate in auctions being conducted at remote, on-line auction sites via an intermediary Web site without having to visit the auction sites. Users can request the intermediary Web site to place a bid on selected auction items displayed via the intermediary Web site as described above. In addition, an intermediary Web site can provide each user with updated information about the status of an auction that the user is participating in at one or more future times.

The present invention may allow users the opportunity to shop for the best available price for items being sold at remote, on-line auction sites, without requiring users to visit each auction site. In addition, the present invention may allow remote, on-line auction sites to reach more potential buyers and sellers. For sellers, the present invention may provide an efficient way to find the right auction in which to list items for sale.

BRIEF DESCRIPTION OF THE DRAWINGS

FIG. 7 illustrates an HTML page from the auction site where the first item in the list of FIG. 6 is being auctioned. The illustrated HTML page provides details about the selected item and provides various fields that allow a user to place a bid for the item.

FIG. 9 illustrates a list of auction sites located as a result of a search for the term "stamps" conducted via the HTML page of FIG. 8.

DETAILED DESCRIPTION OF THE INVENTION

Figure 1:
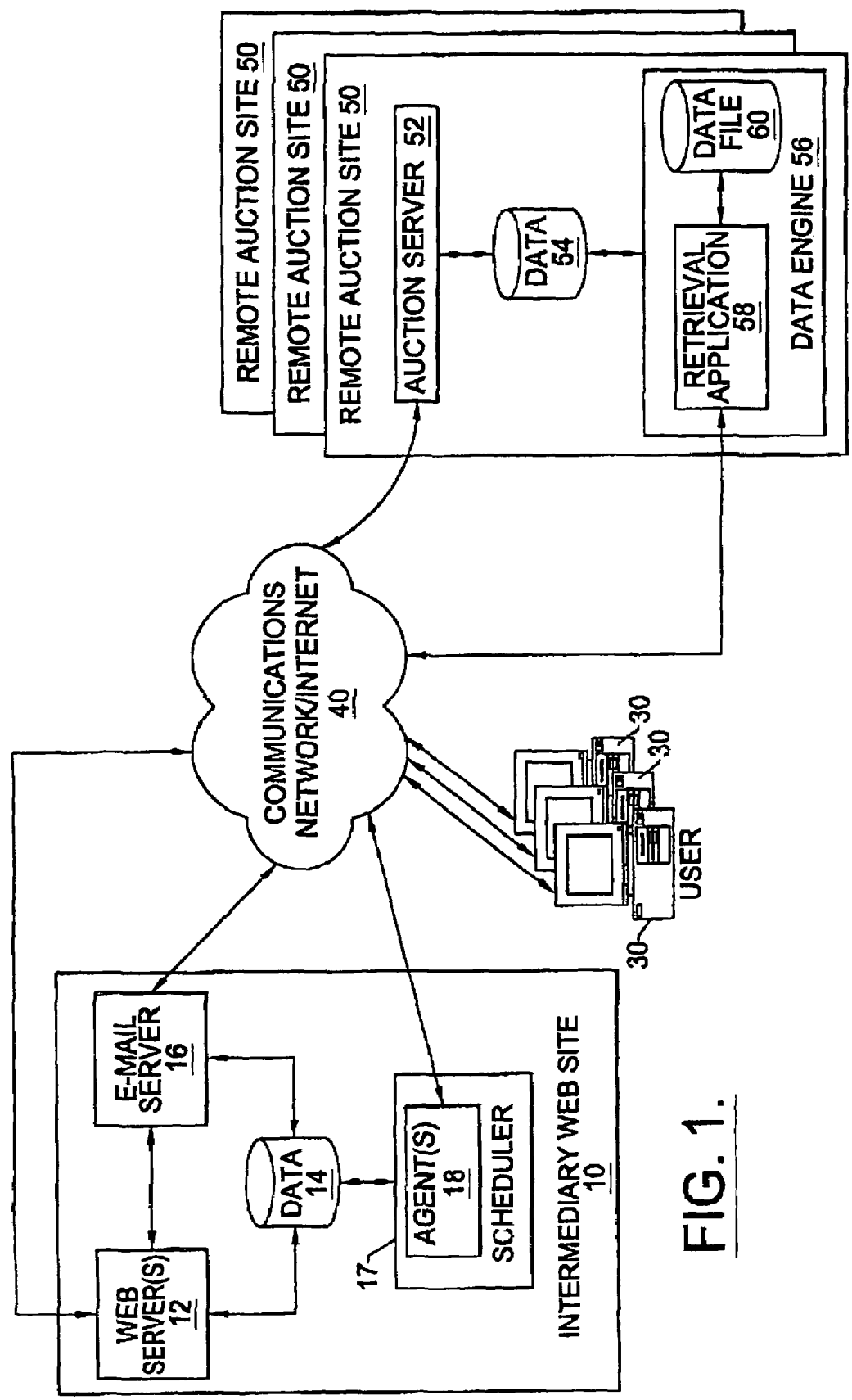
FIG. 1 is a diagrammatic representation of a Web site of an intermediary in communication with a plurality of remotely located auction sites according to an embodiment of the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout the description of the drawings.

THE INTERNET

The Internet is a worldwide decentralized network of computers having the ability to communicate with each other. The Internet has gained broad recognition as a viable medium for communicating and for conducting business. The World-Wide Web (Web) was created in the early 1990's, and is comprised of server-hosting computers (Web servers) connected to the Internet that have hypertext documents (referred to as Web pages) stored therewithin. Web pages are accessible by client programs (e.g., Web browsers) utilizing the Hypertext Transfer Protocol (HTTP) via a Transmission Control Protocol/Internet Protocol (TCP/IP) connection between a client-hosting device and a server-hosting device. While HTTP and Web pages are the prevalent forms for the Web, the Web itself refers to a wide range of protocols including Secure Hypertext Transfer Protocol (HTTPS), File Transfer Protocol (FTP), and Gopher, and Web content formats including plain text, HyperText Markup Language (HTML), Extensible Markup Language (XML), as well as image formats such as Graphics Interchange Format (GIF) and Joint Photographic Experts Group (JPEG).

A Web site is conventionally a related collection of Web files that includes a beginning file called a "home" page. From the home page, a visitor can access other files and applications at a Web site. A large Web site may utilize a number of servers, which may or may not be different and which may or may not be geographically-dispersed. For example, the Web site of the International Business Machines Corporation (www.ibm.com) consists of thousands of Web pages and files spread out over multiple Web servers in locations world-wide.

A Web server (also referred to as an HTTP server) is a computer program that utilizes HTTP to serve files that form Web pages to requesting Web clients. Exemplary Web servers include International Business Machines Corporation's family of Lotus Domino® servers, the Apache server, and Microsoft's Internet Information Server (IIS), available from Microsoft Corporation, Redmond, Wash. A Web client is a requesting program that also utilizes HTTP. A browser is an exemplary Web client for use in requesting Web pages and files from Web servers. A Web server waits for a Web client, such as a browser, to open a connection and to request a specific Web page or application. The Web server then sends a copy of the requested item to the Web client, closes the connection with the Web client, and waits for the next connection.

HTTP allows a browser to request a specific item, which a Web server then returns and the browser renders within a display screen. To ensure that browsers and Web servers can interoperate unambiguously, HTTP defines the exact format of requests (HTTP requests) sent from a browser to a Web server as well as the format of responses (HTTP responses) that a Web server returns to a browser. Exemplary browsers that can be utilized by users accessing an intermediary Web site according to the present invention include, but are not limited to, Netscape Navigator® (America Online, Inc., Dulles, Va.) and Internet Explorer™ (Microsoft Corporation, Redmond, Wash.). Browsers typically provide a graphical user interface for retrieving and viewing Web pages, applications, and other resources served by Web servers.

As is known to those skilled in this art, a Web page is conventionally formatted via a standard page description language such as HTML, which typically contains text and can reference graphics, sound, animation, and video data. HTML provides for basic document formatting and allows a Web content provider to specify anchors or hypertext links (typically manifested as highlighted text) to other servers. When a user selects (i.e., activates) a particular hypertext link, a browser running on the user's client device reads and interprets an address, called a Uniform Resource Locator (URL) associated with the hypertext link, connects the browser with a Web server at that address, and makes a request (e.g., an HTTP request) for the file identified in the hypertext link. The Web server then sends the requested file to the client device which the browser interprets and renders within a display screen.

As will be appreciated by one of skill in the art, the present invention may be embodied as methods, data processing systems, and/or computer program products. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program code for carrying out operations of the present invention may be written in an object oriented programming language such as JAVA®, Smalltalk or C++. The computer program code for carrying out operations of the present invention may also be written in conventional procedural programming languages, such as "C", JavaScript, Visual Basic, TSQL, Perl, or in a functional (or fourth generation) programming language such as Lisp, SML, or Forth. In addition, Microsoft Active Server Pages (ASP) technology and Java Server Pages (JSP) technology may be utilized. Portions of the program code may execute entirely on one or more data processing systems utilized by an intermediary Web site. In addition, portions of the program code may execute entirely on one or more remote data processing systems utilized by remotely located Web sites hosting respective auctions.

The present invention is described below with reference to block diagram and/or flowchart illustrations of methods, apparatus (systems) and computer program products according to an embodiment of the invention. It is understood that each block of the block diagram and/or flowchart illustrations, and combinations of blocks in the block diagram and/or flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the block diagram and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block diagram and/or flowchart block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block diagram and/or flowchart block or blocks.

Referring now to FIG. 1, a Web site 10 of an intermediary that allows users to search and retrieve information from multiple on-line auction sites 50 according to an embodiment of the present invention is illustrated. The illustrated intermediary Web site 10 includes a Web server 12, a database 14, and an e-mail server 16. Although a single Web server 12, a single database 14, and a single e-mail server 16 are illustrated, it is understood that multiple Web servers, multiple databases, and multiple e-mail servers may be utilized to perform the various functions of the intermediary Web site 10. Moreover, the functionality of the Web server 12, the e-mail server 16, and/or the database 14 may be integrated together.

The Web server 12 is the "front end" component of the intermediary Web site 10 and is configured to handle various client requests from users accessing the intermediary Web site 10. Exemplary Web servers that may be utilized as a Web server 12 in the illustrated system 10 are Apache, available from the Apache Server Project, Microsoft's Internet Information Server (IIS), available from Microsoft Corporation, Redmond, Wash.; and Netscape's FastTrack® and Enterprise™ servers, available from America Online, Inc., Dulles, Va. Other Web servers that may be utilized include Novell's Web Server for users of its NetWare® operating system, available from Novell, Inc., San Jose, Calif.; and IBM's family of Lotus Domino® servers, available from International Business Machines Corporation, Armonk, N.Y.

As is known by those of skill in the art, a database is a collection of data that is organized in "tables." A database typically includes a database manager that facilitates accessing, managing, and updating data within the various tables of a database. Exemplary types of databases that can be utilized to perform the various functions of the illustrated database 14, according to the present invention, include relational databases, distributed databases (databases that are dispersed or replicated among different points in a network), and object-oriented databases. Relational, distributed, and object-oriented databases are well understood by those of skill in the art and need not be discussed further herein. Exemplary databases that can be utilized to perform the various functions of the illustrated database 14 include, but are not limited to, IBM's DB2® database, Microsoft's SQL server database, and database products from Oracle, Sybase, and Computer Associates.

A database server (not illustrated) may be utilized to serve as a "middleman" server between the Web server 12 and the database 16. As is known to those of skill in the art, a database server includes program code and logic for retrieving data from databases (and from sources external to a Web site) in response to requests from a Web server. Exemplary database servers that may be utilized as a database server 14 in the illustrated system 10 include Microsoft's SQL server, IBM DB2® Universal Database server, and the WebSphere™ Net.Commerce server, the latter two being available from International Business Machines Corporation, Armonk, N.Y.

The illustrated intermediary Web site 10 is configured to communicate with users 30 accessing the intermediary Web site 10 via a client program, such as a browser, running on a client device, such as a personal computer. However, it is understood that electronic devices including, but not limited to, wireless communications devices, personal digital assistants (PDAs), hand-held computers, Internet-ready phones, and WebTVs, may be utilized as client devices for accessing the intermediary Web site 10 in accordance with the present invention. In addition, the illustrated intermediary Web site 10 is configured to communicate with each of a plurality of remote, on-line auction sites 50 in communication with the computer network 40.

Each remote auction site 50 includes an auction server 52 and at least one database 54 for storing information about items currently being auctioned. The auction server 52 at each auction site 50 includes program code, logic and graphics to conduct one or more on-line auctions, including auctions with various formats, in real time. Auction servers are well known to those of skill in the art and need not be described further herein.

According to an embodiment of the present invention, each auction site 50 also includes a data engine 56 that is configured to obtain information about items auctioned at the respective auction site 50. In particular, each data engine 56 is configured to obtain auction item data that has changed since a previous time for respective items being auctioned and is configured to transmit this information to the intermediary Web site 10.

According to a preferred embodiment of the present invention, each data engine 56 includes a data retrieval application 58 that is configured to retrieve data from an auction site database. A preferred data retrieval application is a Common Gateway Interface (CGI) application. As is understood by those of skill in the art, CGI is a standard that allows clients to interface with various applications via Web servers. A Web server processes a client CGI request using a CGI script or application. For example, when a database is queried by a client, a Web server acts as a gateway between the database and the client. The Web server transmits the client request to a CGI application that performs the database query, formats the results and returns HTML-formatted data to the Web server. The Web server then transmits the HTML-formatted data to the client for display to the user.

Each data engine 56 also includes a data file 60 that is configured to store CRC values for each auction item. CRC values for static and dynamic information associated with each auction item being auctioned at the respective auction site 50 are preferably generated and stored. CRC is well understood by those of skill in the art and need not be described further herein.

In response to a request from the intermediary Web site 10, the retrieval application 58 at a respective auction site 50 queries the auction database(s) 54 for information about each auction item that has changed since a previous time. The retrieval application 58 initially determines whether the data file 60 at the auction site 50 contains a CRC value for "static" information for each item currently being auctioned. Static information includes information that describes an auction item. Dynamic information includes data associated with an auction item that can change over time (i.e., the data is variable) and includes, but is not limited to, number of bids, and auction item price information. That is, the retrieval application determines whether the data file contains a listing of each item currently being auctioned at an auction site.

If a retrieval application 58 determines that an auction item currently being auctioned does not have a CRC value stored within a respective data file 60, the retrieval application 58 creates CRC values for static and dynamic information about the particular auction item and stores these CRC values in the data file 60. A data file 60 may not contain CRC values for an auction item because the auction item may have been added to an auction after a previous query of the auction site database(s) 54 by the retrieval application 58. Static and dynamic information represented by the CRC values stored within a data file 60 is then sent to the intermediary Web site 10 by the data engine 56.

At run time, stored CRC values are compared with new CRC values generated for each auction item. If stored CRC values differ from the newly generated CRC values, the retrieval application 58 stores the new CRC values for the particular auction item in a respective data file 60, and transmits updated static or dynamic information to the intermediary Web site 10.

The intermediary Web site 10 is configured to display to requesting Web clients (i.e., browsers) of users 30, selected information about auction items at various ones of the remotely located auction sites 50. The intermediary Web site 10 further includes an agent 18 that is configured to communicate with and retrieve auction item data from each auction site data engine 56. As is known to those of skill in the art, an agent is a program that gathers information or performs some service. Agents are well understood by those of skill in the art and need not be described further herein.

At various times as scheduled by a scheduler 17, an agent 18 sends a request to a respective data engine 56 at one of the respective auction sites 50 to obtain auction item data that has changed since a previous time for auctions currently being conducted at the respective auction site. Schedulers for starting tasks are well known to those of skill in the art and need not be described further herein. Also, it is understood that multiple agents 18 may run simultaneously.

Each agent 18 is configured to update the database(s) 14 at the intermediary Web site 10 with auction item data received from various ones of the auction site data engines 56. According to a preferred embodiment of the present invention, an agent 18 extracts keywords from information received from the various data engines 58 and stores the extracted keywords in one or more tables associated with the database(s) 14. Each stored keyword is also associated with an item currently being auctioned at a respective one of the plurality of remotely located auction sites 50.

Preferably, stored keywords are searchable by users accessing the intermediary Web site 10. For example, a user interested in locating auctions having binoculars for sale can enter the keyword "binoculars" in a form displayed in the user's browser. When a user request is received by the Web server 12 a search is initiated to locate stored keywords that match keywords in the user request. Each stored keyword is preferably associated with an item currently being auctioned at a respective one of a plurality of remotely located auction sites 50.

Upon locating one or more keyword matches, the Web server 12 serves the requesting user with a list of items currently being auctioned at one or more of the remotely-located auction sites 50 that match the user-provided keywords. Preferably, auction time and price information associated with each item is also displayed to the user.

According to a preferred embodiment of the present invention, each displayed auction item is selectably linked to the respective auction site such that, upon user activation (e.g., a mouse click), the user's Web client is redirected to the respective auction site where the selected item is currently being auctioned.

According to another embodiment of the present invention, an e-mail server 16 is configured to send a user e-mail messages containing updated information about selected auction items at one or more future times. For example, if a user expresses interest in an item being auctioned at a particular auction site 50, the intermediary Web site 10 will provide the user with updates including, but not limited to, current bid price and time remaining in the auction. Updates may be provided on a daily (or other) basis.

According to another embodiment of the present invention, the intermediary Web site 10 can allow users to list items for sale in auctions conducted at remotely located auction sites 50.

Figure 2:
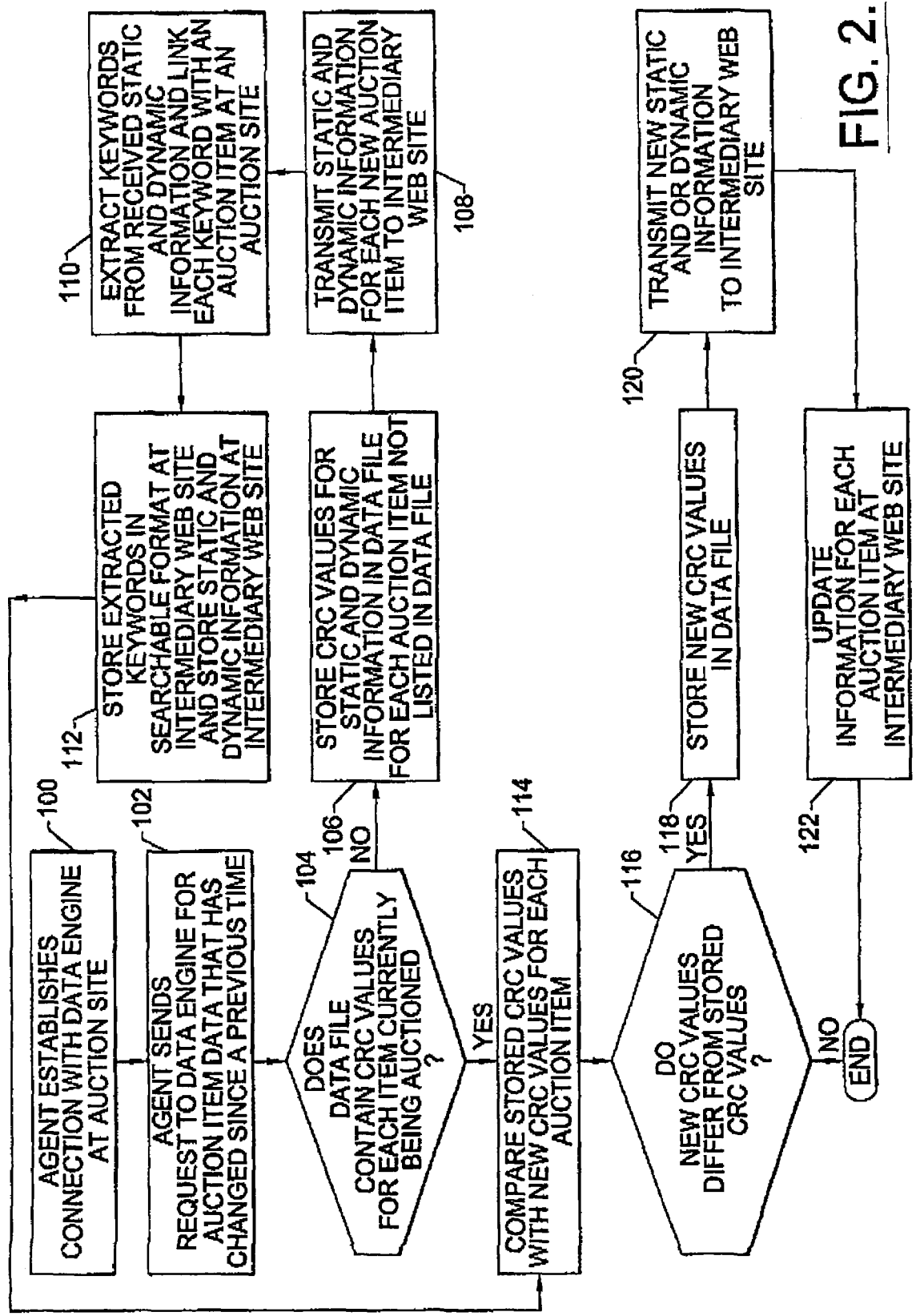
FIG. 2 is a flow chart illustrating operations for obtaining auction information from a plurality of auction sites on a computer network, according to an embodiment of the present invention.

Referring now to FIG. 2, operations for obtaining auction item information from auctions conducted at a plurality of remotely-located auction sites, according to an embodiment of the present invention, are illustrated. An agent at an intermediary Web site establishes a connection (e.g., a TCP/IP connection) with a data engine at a respective auction site (Block 100) and sends a request (e.g., an HTTP request) for auction item data that has changed since a previous time (Block 102).

In response to receiving the request, the data engine at an auction site determines whether CRC values for each item currently being auctioned at the auction site is stored within a data file (Block 104). In other words, the data engine makes a determination whether new items have been added to an auction being conducted (or about to be conducted) at the auction site since a previous time. If the answer at Block 104 for a particular auction item is "No", CRC values for static and dynamic information for the auction item are stored within the data file (Block 106). The actual static and dynamic information for the particular auction item is then transmitted to the intermediary Web site (Block 108).

At the intermediary Web site, keywords are extracted from the received static and dynamic information and a link is established between each keyword and an auction item at a respective auction site from which the information was transmitted (Block 110). The extracted keywords are then stored within a database at the intermediary Web site in a searchable format (Block 112). The auction item data (i.e., dynamic and/or static information) is stored at the intermediary Web site, as well. Operations return to Block 114 which is described below.

If the answer at Block 104 for a particular auction item is "Yes", the data engine at an auction site compares stored CRC values with new CRC values generated at run time for each item currently being auctioned (Block 114). The data engine makes a determination whether the stored CRC values for each auction item differ from the new CRC values (i.e., has information about an auction item changed, such as bid price?) (Block 116). If the answer is "Yes" for any items in an auction, the new CRC values for an auction item are stored within the data file (Block 118). The current dynamic and/or static information is then transmitted to the intermediary Web site (Block 120) and the dynamic and/or static information maintained by the intermediary Web site is updated (Block 122).

Figure 3:
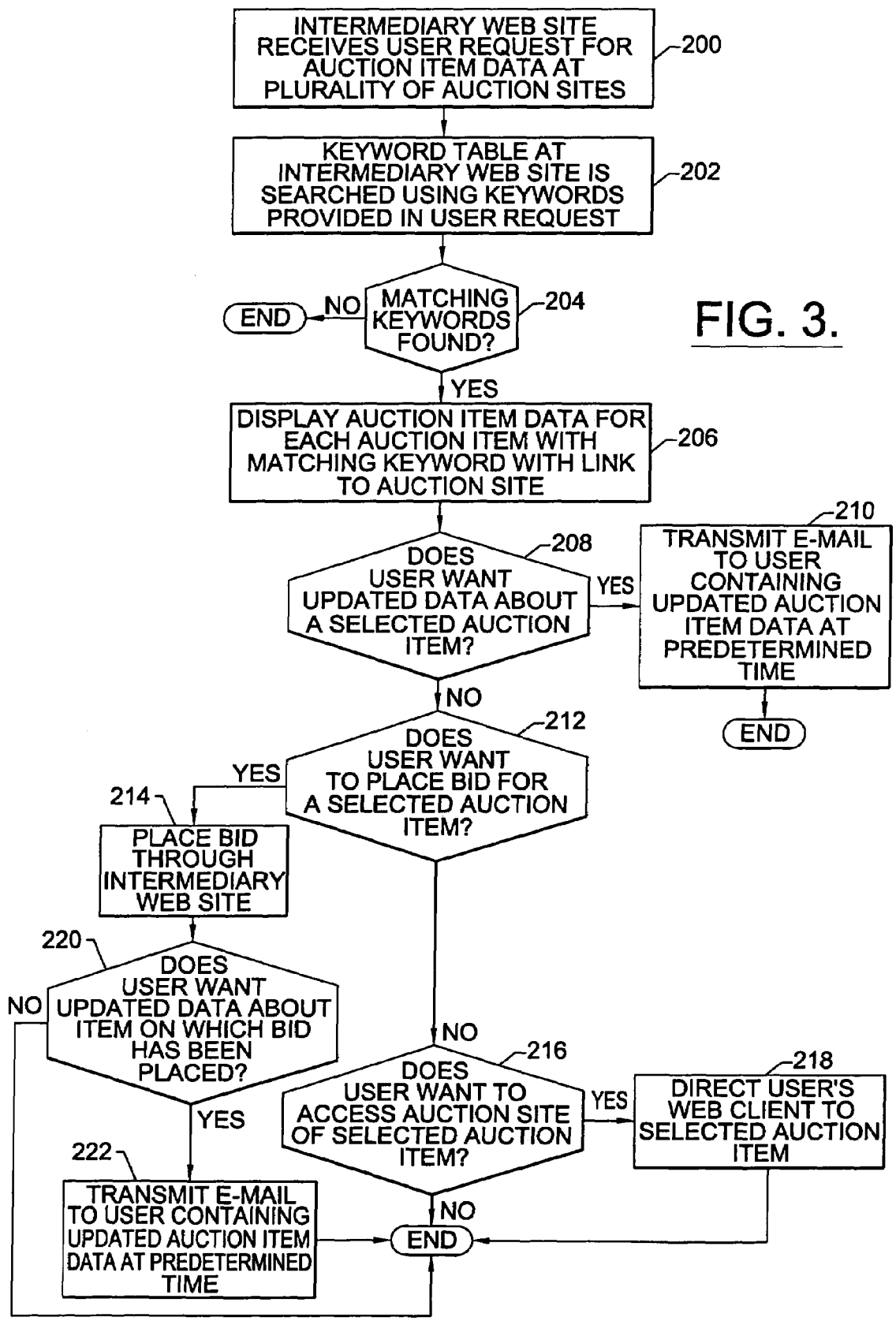
FIG. 3 is a flow chart illustrating operations for providing information about items being auctioned at a plurality of auction sites on a computer network according to an embodiment of the present invention.

Referring now to FIG. 3, operations for providing information, via an intermediary Web site, about items being auctioned at a plurality of remotely located auction sites on a computer network, according to an embodiment of the present invention, are illustrated. An intermediary Web site receives a user request for information about items currently being auctioned at one or more auction sites (Block 200). A keyword table maintained at the intermediary Web site is searched for matches with keywords identified in the user request (Block 202). Each keyword in the table maintained by the intermediary Web site is associated with an item currently being auctioned at a respective one of a plurality of remotely located auction sites. In addition, various auction item parameters may be included with a user request. Exemplary auction item parameters include, but are not limited to, auction item price ranges, types of auctions or sales, time periods, and the like.

If no matching keywords are found (Block 204) operations end. However, if one or more keywords are found that match keywords in a user request (Block 204), information about one or more items currently being auctioned at a respective one of the plurality of remotely located auction sites that is associated with the located keyword is displayed (Block 206). According to a preferred embodiment of the present invention, the displayed information includes an identification of an auction item along with other information, such as auction end times, and price information. Also preferably, at least a portion of the displayed information is selectably linked to the respective auction site where the selected item is being auctioned such that, upon user activation, a user's Web client is redirected to the respective auction site.

A determination is made whether a user wants to receive updated information about a selected auction item in the future (Block 208). For example, a user may wish to know what the current bid price is for a particular auction item. If a user wishes to receive updated information about an auction item in the future, an e-mail message may be transmitted to the user via an e-mail server at the intermediary Web site at predetermined times subsequent to when the status of the auction item changes (Block 210). For example, each time the bid for an auction item is increased, a user may be notified via an e-mail message. As another example, a user may be notified nightly when the status of an auction item of interest changes. It is understood that other forms of notification may be utilized. The present invention is not limited to notification via e-mail.

According to another embodiment of the present invention, a user search may be saved and performed at one or more future times. Newly identified auction items from these future searches may be communicated to the user. For example, an e-mail message may be sent to a user when new search results are generated.

According to another embodiment of the present invention, users may wish to place bids on particular items being auctioned at remote auction sites via the intermediary Web site. Accordingly, a determination is made whether a user wishes to place a bid on one or more displayed auction items (Block 212). If the answer at Block 212 is "Yes", a bid is caused to be placed on behalf of the user at the respective auction site for a selected auction item (Block 214).

A determination is then made whether a user wants to receive updated information about an auction item on which he or she has placed a bid (Block 220). For example, a user may wish to know if someone else has placed a higher bid for the particular item the user has placed a bid on in Block 214. If a user wishes to receive updated information about an auction item on which he or she has placed a bid, an e-mail message is transmitted to the user via the intermediary Web site e-mail server 16 (FIG. 1) each time dynamic and/or static information associated with the auction item changes (Block 222). For example, each time the bid price for the auction item is increased by someone else, the user is notified via e-mail.

If the answer at Block 212 is "No", a determination is then made whether the user wants to access the auction site where a selected auction item is being auctioned (Block 216). If the answer is "Yes", the user's Web client is directed to the auction site where the selected auction item is currently being auctioned (Block 218).

Figure 4:
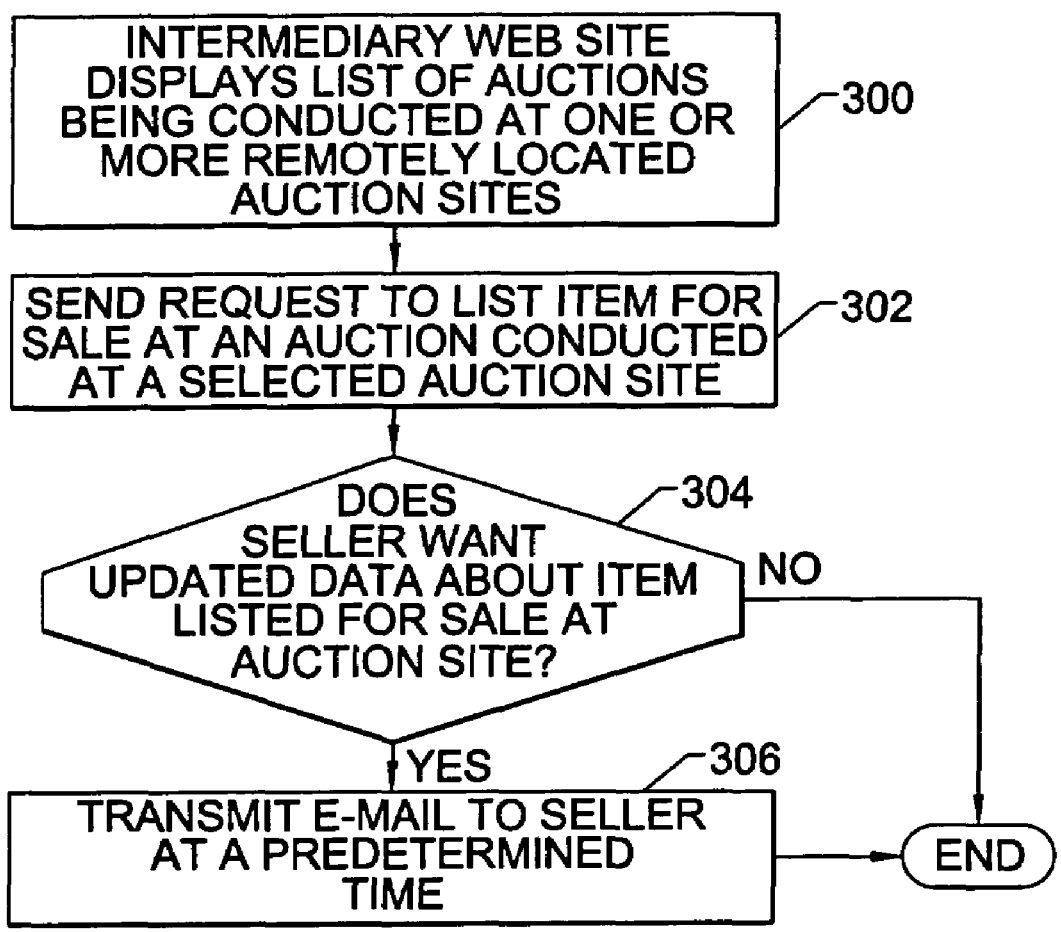
FIG. 4 is a flow chart illustrating operations for listing an item for sale in an auction conducted at a remotely located auction site according to an embodiment of the present invention.

Referring now to FIG. 4, operations for listing an item for sale in an auction conducted at one of a plurality of remotely located auction sites on a computer network, according to an embodiment of the present invention are illustrated. In response to a user request, an intermediary Web site displays a list of auctions being conducted at one or more of the remotely located auction sites (Block 300). In response to receiving a user request at the intermediary Web site, a request is sent to a selected auction site to list an item for sale at an auction conducted at the selected auction site (Block 302). The request may be accompanied by various information including, but not limited to, an identification of the item, a quantity of the item, price information, and auction time information.

A determination is then made whether the seller wants to receive updated information about the item he/she has placed for sale within an auction at an auction site (Block 304). For example, the seller may wish to know if someone has placed a bid on his/her item. If the seller wishes to receive updated information about an the item he/she has placed for sale within an auction, an e-mail message is transmitted to the seller via an intermediary Web site e-mail server each time dynamic information associated with the auction item changes (Block 306). For example, each time the bid for the auction item is increased, the seller is notified via e-mail. Alternatively, seller notification may occur at predetermined times, such as nightly.

Figure 5A:
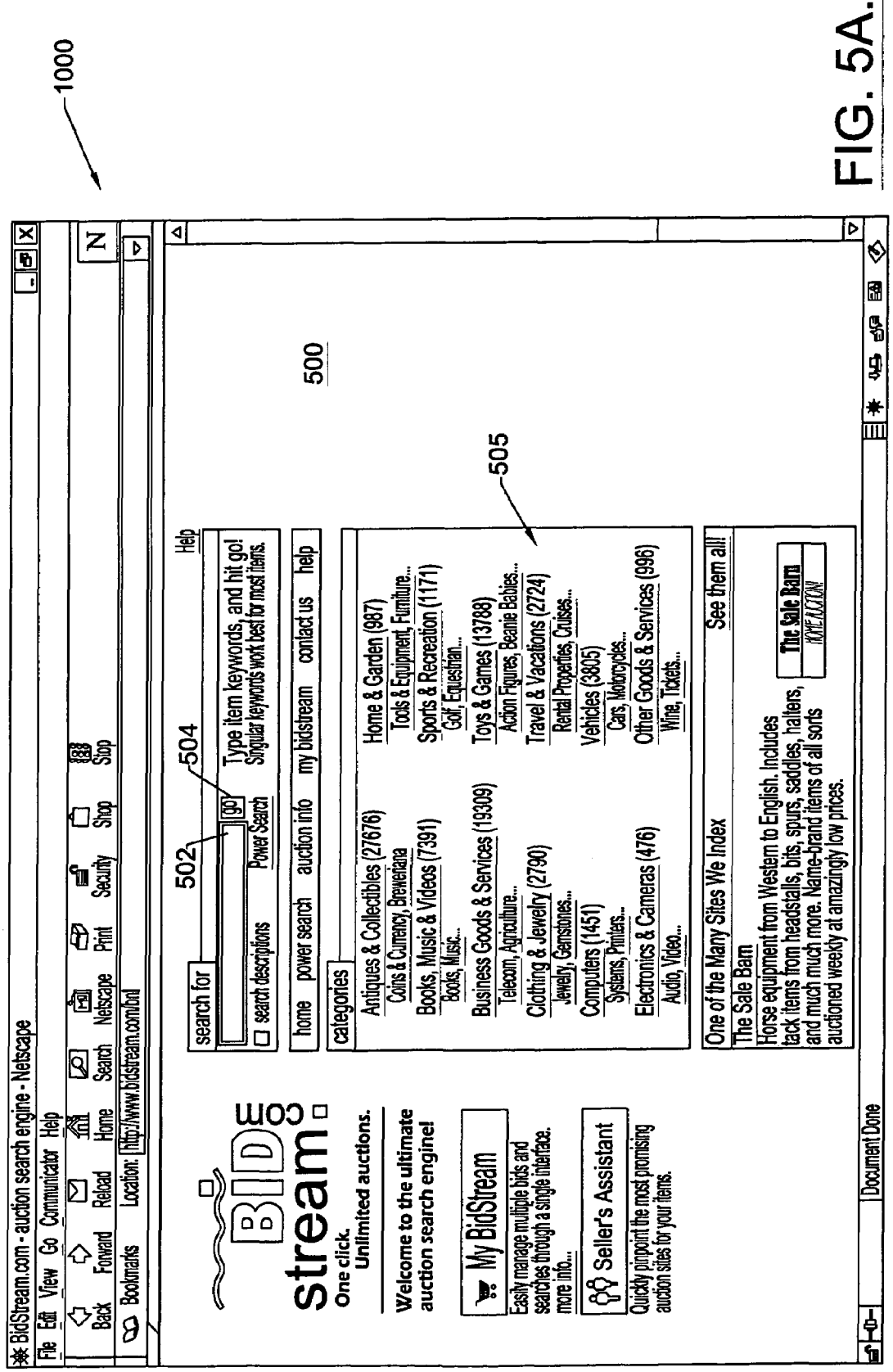
FIGS. 5A-5C illustrate exemplary HTML pages displayed within a Web browser interface that allow users to search for items for sale at a plurality of remotely-located auction sites via the Intermediary Web site of FIG. 1 according to embodiments of the present invention.
Figure 5B:
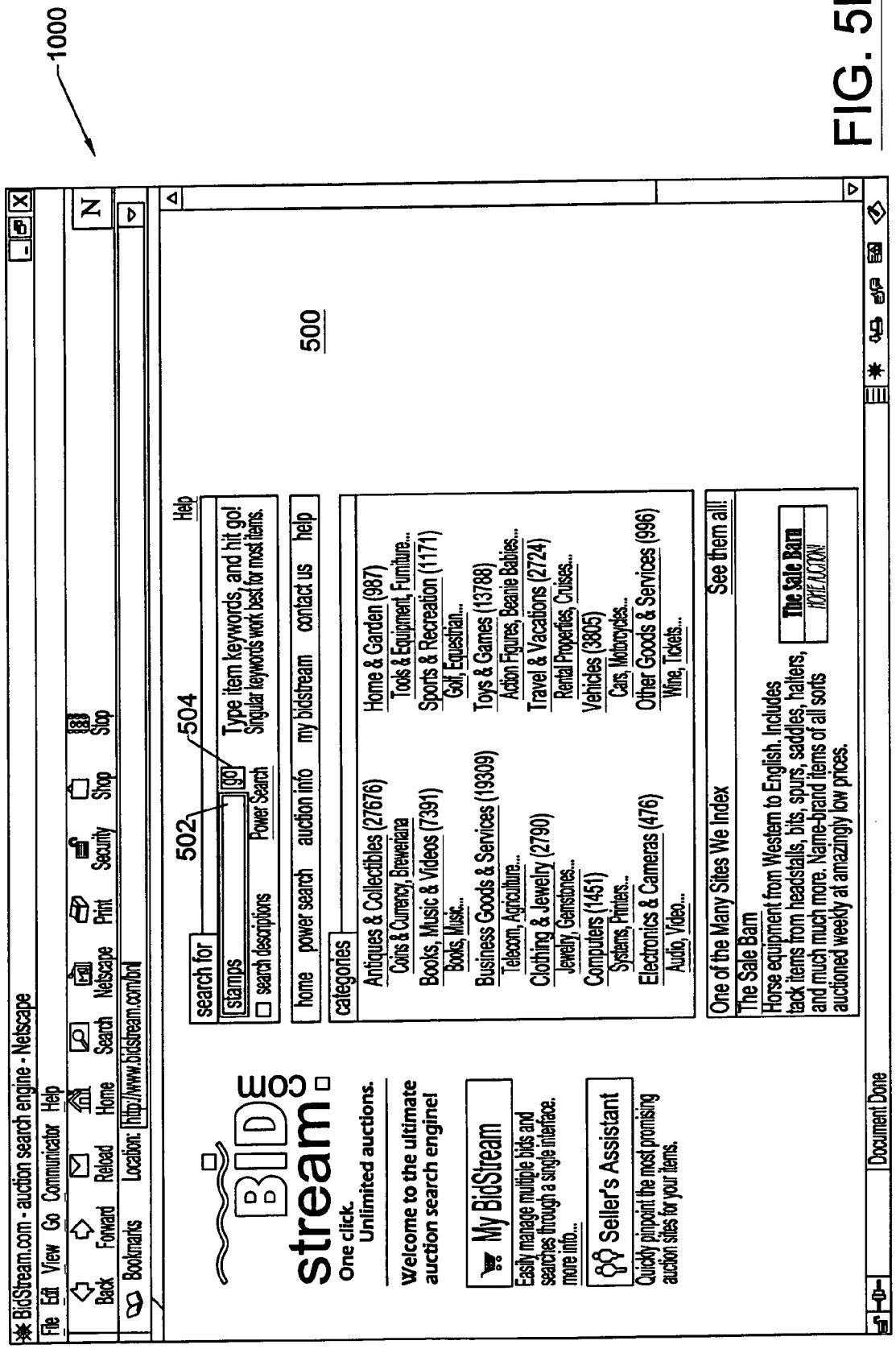

FIGS. 5A-5B illustrate an HTML (Web) page 500 that can be downloaded from an intermediary Web site (10, FIG. 1) according to an embodiment of the present invention and displayed within a Web browser interface 1000 of a user's client device to facilitate searching for items of interest being auctioned at multiple remotely-located auction sites. Using the illustrated Web page 500 of FIGS. 5A-5B, a user provides one or more keywords into field 502 that are descriptive of one or more auction items the user is interested in locating. For example, in FIG. 5B a user has entered the keyword "stamps" in field 502. By activating the "go" button 504, the information within the field 502 is submitted to a Web server (12, FIG. 1) at an intermediary Web site (10, FIG. 1).

Still referring to FIG. 5A, a user can browse items being auctioned at a plurality of auction sites via a category browsing feature 505. As illustrated, auction items are grouped into various categories that can simplify user searching.

Figure 5C:
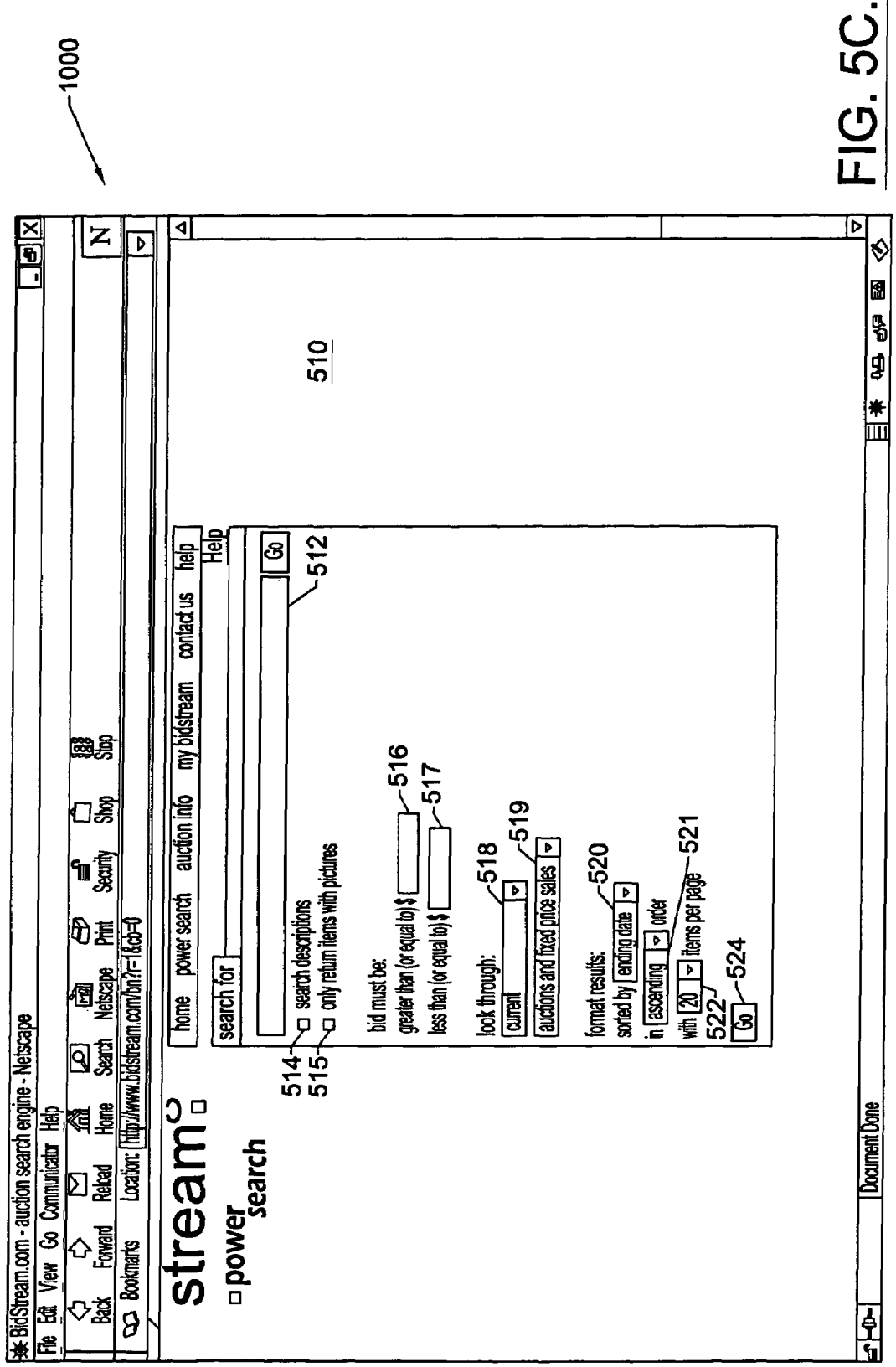

FIG. 5C illustrates another Web page 510 that can be downloaded from an intermediary Web site (10, FIG. 1) and displayed within a Web browser interface 1000 of a user's client device to facilitate searching for items of interest being auctioned at multiple remotely-located auction sites according to another embodiment of the present invention. Using the illustrated Web page 510 of FIG. 5C, a user provides one or more keywords into field 512 that are descriptive of one or more auction items the user is interested in locating. The illustrated Web page 510 provides a user with the option of searching using additional auction item parameters. For example, a user is provided with the option of searching descriptions in addition to titles of auction items, via checkbox 514, and with the option of returning only items having pictures thereof, via checkbox 515. The illustrated Web page 510 allows users to locate auction items having a current bid price greater than or equal to a certain price, via field 516. In addition, the illustrated Web page 510 allows users to locate auction items having a current bid price less than or equal to a certain price, via field 517.

The illustrated Web page 510 allows users to specify that a search for particular items is to be performed for current auctions or auctions conducted within a particular period of time, via field 518. The illustrated Web page 510 also allows users to specify that auctions, or fixed price sales, or auctions and fixed price sales are to be searched, via field 519.

In addition, the illustrated Web page 510 allows a user to format search results in a sorted order via field 520, in ascending or descending order via field 521, and by number of items per page, via field 522. By activating the "Go" button 524, the information within the various fields of the Web page 510 is submitted to a Web server at an intermediary Web site (10, FIG. 1).

Figure 6A:
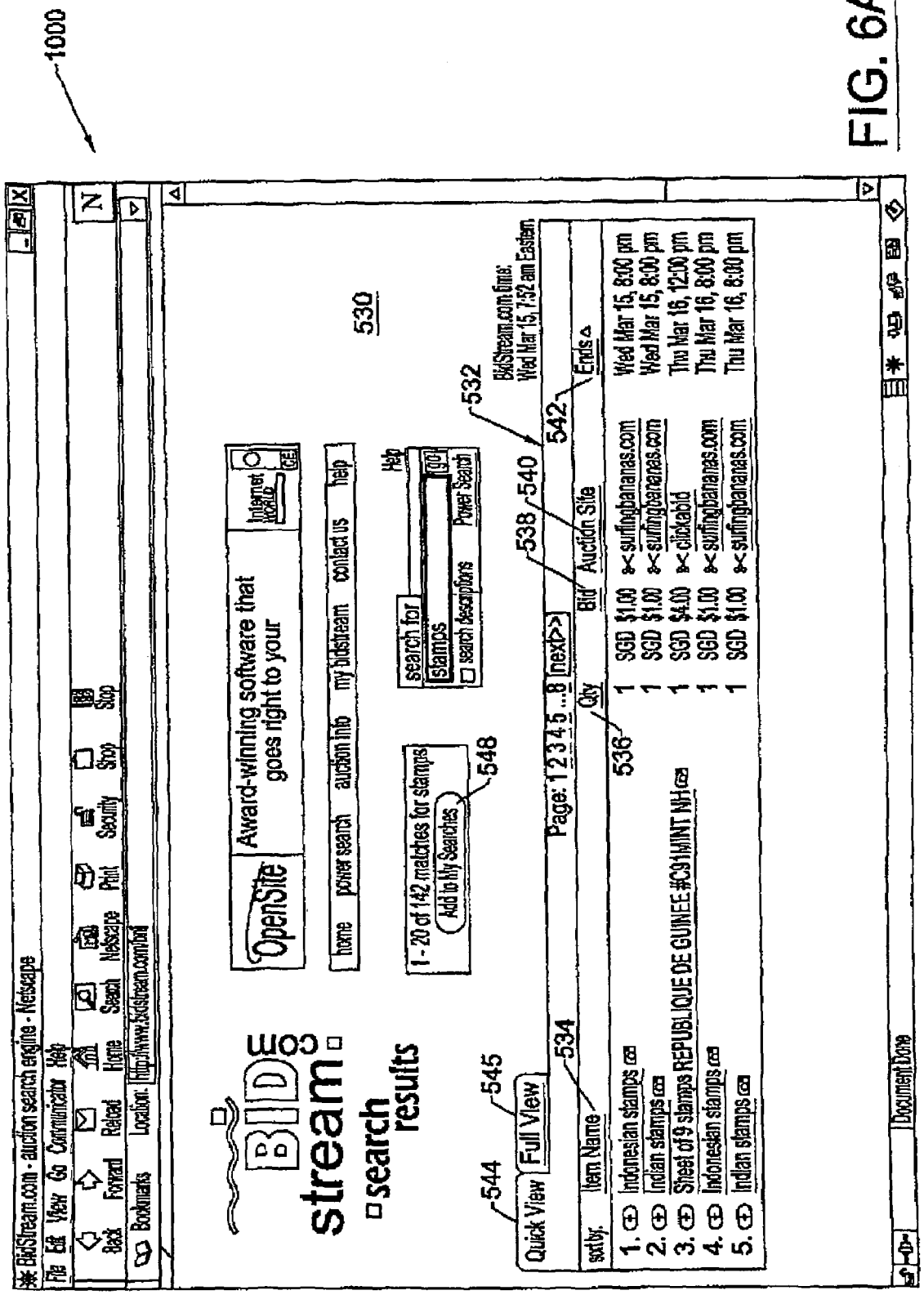
FIG. 6A illustrates a list of search results in "Quick View" format from a user search conducted for the term "stamps" via the HTML page of FIG. 5B.
Figure 6B:
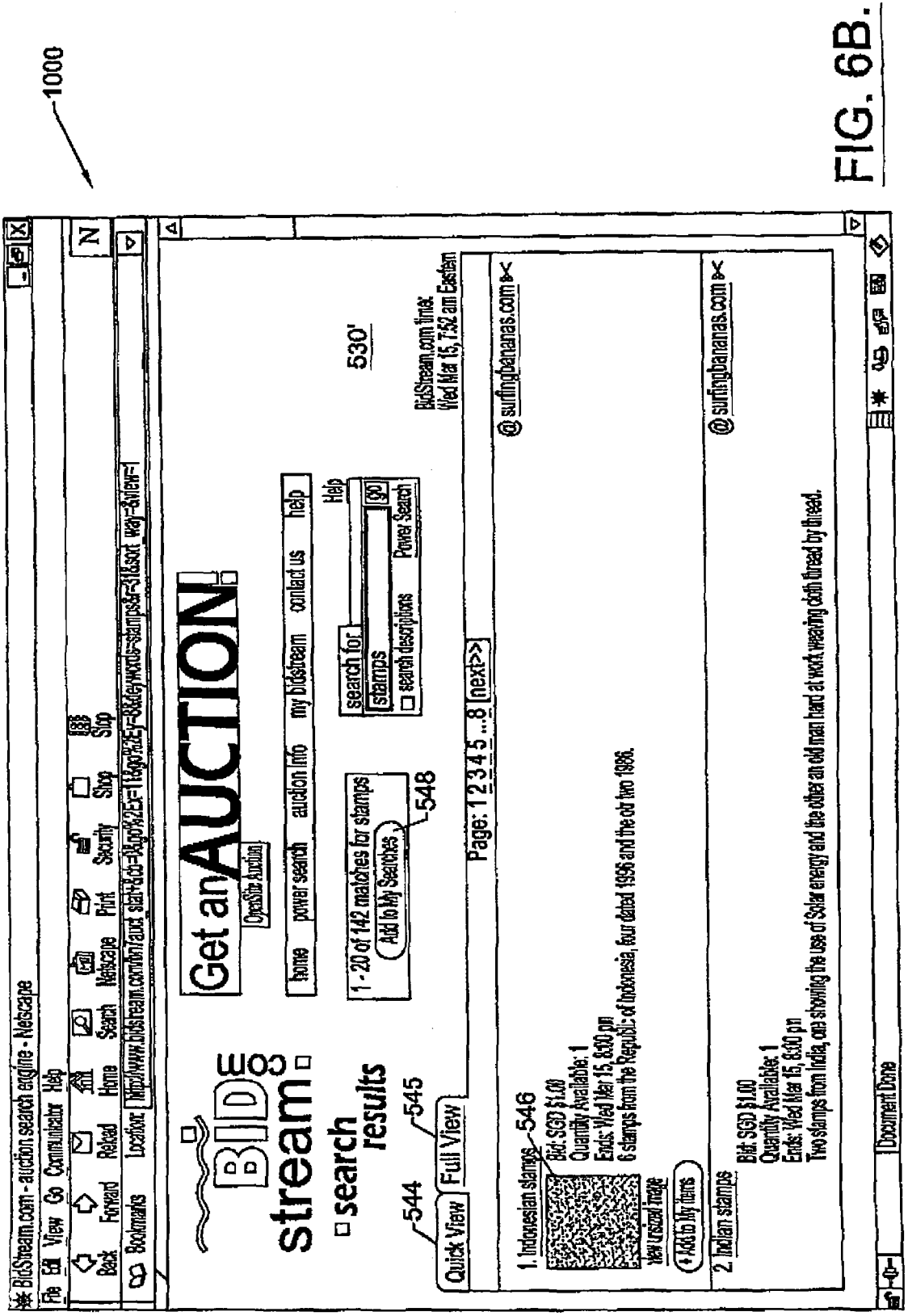
FIG. 6B illustrates the search results of FIG. 6A in "Full View" format.

Referring now to FIGS. 6A-6B, search results from a search conducted for the keyword "stamps" via the Web page 500 of FIG. 5B are displayed in a Web page 530, as illustrated. In FIG. 6A, a list of auction items 532 that satisfy the search term "stamps" are illustrated in "Quick View" format. In the illustrated "Quick View" format, each located auction item is listed with the following information: Item Name 534, Quantity 536, Bid Price 538, Auction Site URL 540, and Auction End Date/Time 542. Each auction item listed under Item Name 534 is a hypertext link to a description Web page 550 (FIG. 7) at a respective auction site where the item is being auctioned.

Tabs 544, 545 in the displayed Web page 530 of FIG. 6A allow a user to view search results in "Quick View" and "Full View" formats, respectively. The search results of FIG. 6A are illustrated in "Full View" format in FIG. 6B. In "Full View" format (FIG. 6B), additional information about an auction item is displayed as illustrated in Web page 530'. For example, an image 546 of an auction item may be provided, when available from an auction site.

Figure 7:
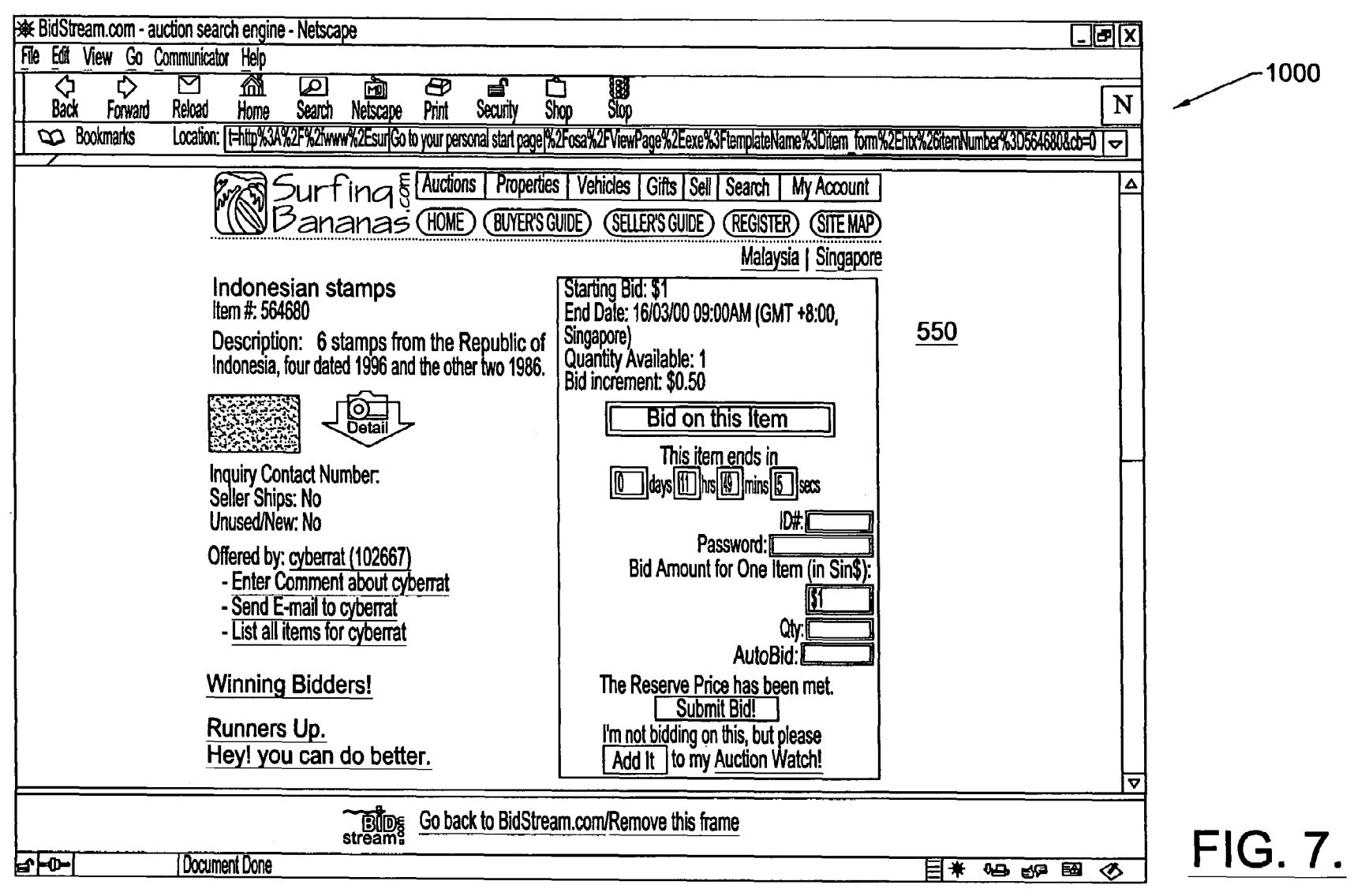

Upon selecting a particular auction item listed in "Quick View" format (FIG. 6A) or "Full View" format (FIG. 6B), a user's Web client is directed to the particular auction site where the selected item is being auctioned. For example, upon selecting (i.e., "clicking-on") the hypertext link "Indonesian stamps" of the first auction item in the displayed list of FIG. 6A, the illustrated Web page 550 of FIG. 7 is served from the auction site "Surfing Bananas.com" and displayed within the requesting user's browser interface 1000. The illustrated Web page 550 provides various information about the selected auction item. In addition, various fields are provided which allow a user to place a bid on the selected item.

According to another embodiment of the present invention, a user may store a search by activating button 548 in FIGS. 6A and 6B. The stored search may then be conducted at one or more future times and new auction item information may be communicated to the user.

Figure 8:
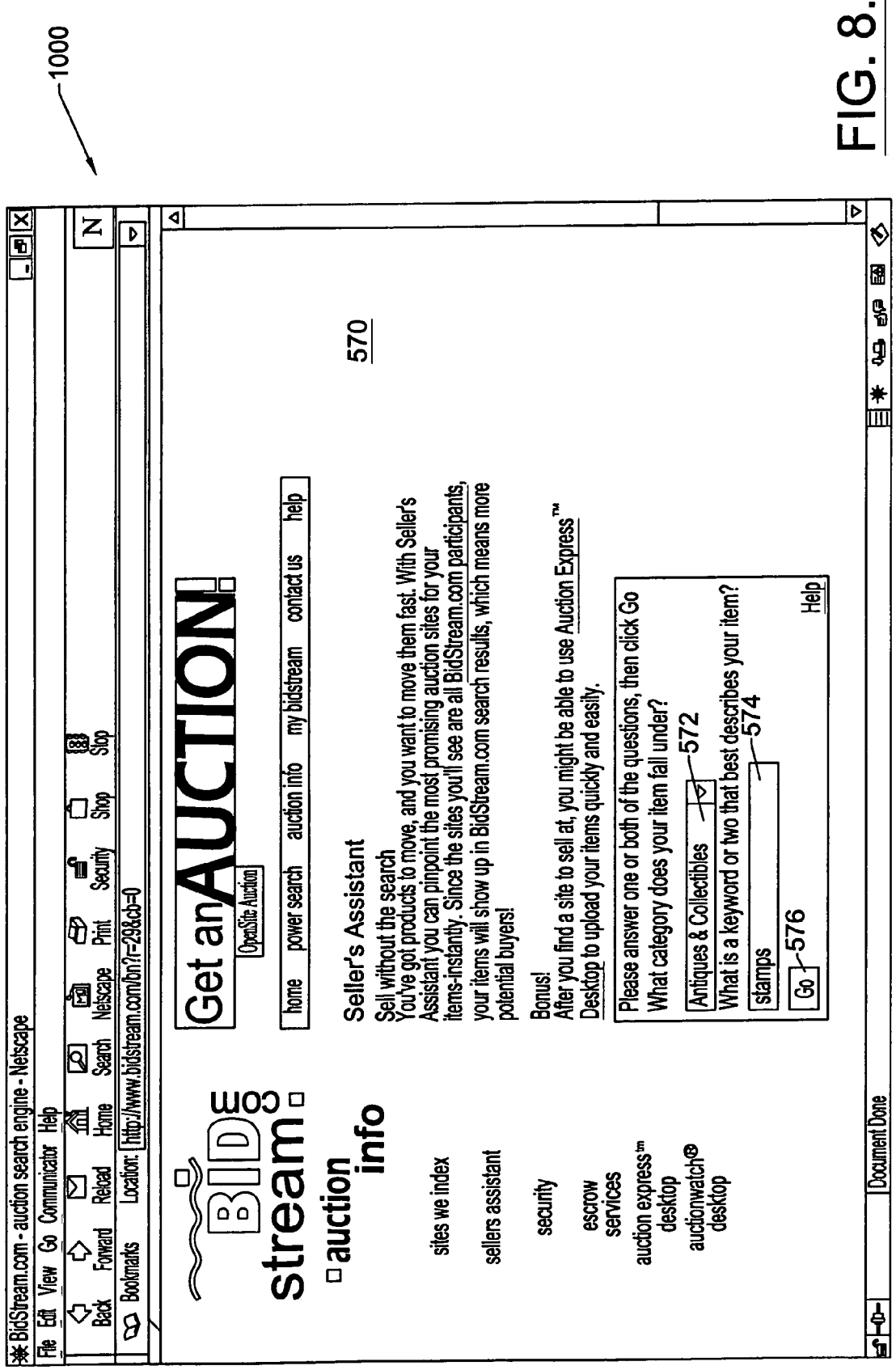
FIG. 8 illustrates an exemplary HTML page displayed within a Web browser interface that allows sellers to determine which auction sites may be best suited for auctioning items a seller has for sale according to an embodiment of the present invention.

Referring now to FIG. 8, a Web page 570, according to another embodiment of the present invention, is displayed within a Web browser interface 1000 that allows sellers to select auction sites best suited for auctioning particular items. In the illustrated Web page 570, a user can select a particular category for an item via field 572. In addition, a user can input a keyword or two in field 574 that best describes an item the user wishes to sell. By activating the "Go" button 576, the information within fields 572, 574 is submitted to a Web server (12, FIG. 1) of an Intermediary Web site (10, FIG. 1).

Referring now to FIG. 9, search results from a search conducted for the category "Antiques and Collectibles" in field 572 and the keyword "stamps" in field 574 of the Web page 570 of FIG. 9 are displayed in a Web page 580. The search results include a list and description of auction sites 582 that satisfy the multiple conditions (keyword and category) of the seller's search. In the illustrated Web page 580, search results are arranged by keyword "stamps" and by category "Antiques and Collectibles". Also, users can "rate" each auction site. Upon activating a "rate" button 583, users can provide information about a particular auction site to the intermediary Web site. Rating results are tallied and displayed by the intermediary Web site. In FIG. 9, rating results are indicated by icons 584.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of updating information maintained at an intermediary web site on a computer network about items being auctioned at a plurality of remotely located auction sites on the computer network, wherein the updated information is displayable to users accessing the intermediary web site via the computer network, the method comprising:

obtaining auction item data that has changed since a previous time for auctions currently being conducted at the respective auction sites, wherein each auction site includes a data engine that is configured to obtain data about each item currently being auctioned at the respective auction site, and wherein the intermediary web site includes an agent that is configured to communicate with and retrieve auction item data from each auction site data engine, comprising:

establishing a TCP/IP connection between the agent and each respective data engine; and sending an HTTP request from the agent to each respective data engine via the TCP/IP connection to obtain auction item data that has changed since a previous time;

extracting keywords from the obtained auction item data via the agent; and storing the extracted keywords via the agent, wherein each stored keyword is associated with an item currently being auctioned at a respective one of the plurality of remotely located auction sites, and wherein the stored keywords are searchable by users accessing the intermediary web site.

2. The method according to claim 1 wherein obtaining auction item data that has changed since a previous time is performed at predetermined time intervals.

3. A method of updating information maintained at an intermediary web site on a computer network about items being auctioned at a plurality of remotely located auction sites on the computer network, wherein the updated information is displayable to users accessing the intermediary web site via the computer network, the method comprising:

obtaining auction item data that has changed since a previous time for auctions currently being conducted at the respective auction sites, wherein each auction site includes a data engine that is configured to obtain data about each item currently being auctioned at the respective auction site, and wherein the intermediary web site includes an agent that is configured to communicate with and retrieve auction item data from each auction site data engine comprising:
  establishing a TCP/IP connection between the agent and each respective data engine; and
  sending an HTTP request from the agent to each respective data engine via the TCP/IP connection to obtain auction item data that has changed since a previous time; extracting keywords from the obtained auction item data via the agent; and
storing the extracted keywords via the agent wherein each stored keyword is associated with an item currently being auctioned at a respective one of the plurality of remotely located auction sites, and wherein the stored keywords are searchable by users accessing the intermediary web site,
wherein the data engine at each auction site comprises a data file configured to store cyclic redundancy checking (CRC) values for static and dynamic information about each auction item being auctioned at the respective auction site, wherein static information comprises an identification of an auction item, wherein dynamic information comprises at least one of bid information and price information associated with an auction item, and wherein obtaining auction item data that has changed since a previous time comprises the following performed by each respective data engine:
determining whether the data file contains a CRC value for each item currently being auctioned;
storing CRC values in the data file for each item currently being auctioned that does not have a CRC value in the data file; and
sending static and dynamic information to the intermediary web site for each item currently being auctioned that does not have a CRC value in the data file.

4. The method according to claim 3 wherein obtaining auction item data that has changed since a previous time further comprises the following performed by each respective data engine:
  generating new CRC values for each item currently being auctioned;
  comparing the new CRC values with CRC values stored within the data file for each respective auction item;
  storing the new CRC values for each item currently being auctioned in the respective data file if the new CRC values differ from the stored CRC values; and
  sending to the intermediary web site current information for each item currently being auctioned.

5. A method of updating information maintained at an intermediary web site on a computer network about items being auctioned at a plurality of remotely located auction sites on the computer network, wherein the updated information is displayable to users accessing the intermediary web site via the computer network, the method comprising:
  obtaining data about each item currently being auctioned at each respective auction site, wherein each auction site includes a data engine comprising a data file configured to store cyclic redundancy checking (CRC) values for static and dynamic information about each auction item being auctioned at the respective auction site, wherein static information comprises an identification of an auction item, wherein dynamic information comprises at least one of bid information and price information associated with an auction item;
  sending a request from the intermediary web site to the plurality of respective data engines to obtain auction item data that has changed since a previous time for auctions currently being conducted at the respective auction sites, wherein the intermediary web site includes an agent that is configured to communicate with and retrieve auction item data from each auction site data engine;
  obtaining auction item data that has changed since a previous time for auctions currently being conducted at the respective auction sites, comprising the following performed by each respective data engine:
    determining whether a data file contains a CRC value for each item currently being auctioned;
    storing CRC values in the data file for each item currently being auctioned that does not have a CRC value in the data file;
    sending static and dynamic information to the intermediary web site for each item currently being auctioned that does not have a CRC value in the data file; and
    updating the information maintained at the intermediary web site with the static and dynamic information received from each respective data engine, comprising:
      extracting keywords from the received static and dynamic information via the agent; and
      storing the extracted keywords via the agent, wherein each stored keyword is associated with an item currently being auctioned at a respective one of the plurality of remotely located auction sites, and wherein the stored keywords are searchable by users accessing the intermediary web site.

6. The method according to claim 5 wherein sending a request from the agent to each of a plurality of respective data engines is performed at predetermined time intervals.

7. The method according to claim 5 wherein obtaining auction item data that has changed since a previous time further comprises the following performed by each respective data engine:
  generating new CRC values for each item currently being auctioned;
  comparing the new CRC values with CRC values stored within a data file for each respective auction item;
  storing the new CRC values for each item currently being auctioned in the respective data file if the new CRC values differ from the stored CRC values; and
  sending to the intermediary web site current information for each item currently being auctioned.

* * * * *

UNITED STATES PATENT AND TRADEMARK OFFICE
CERTIFICATE OF CORRECTION

PATENT NO. : 7,289,967 B1
APPLICATION NO. : 09/549370
DATED : October 30, 2007
INVENTOR(S) : Brader-Araje et al.

It is certified that error appears in the above-identified patent and that said Letters Patent is hereby corrected as shown below:

On the Title Page, item (54), in the "Title", in column 1, line 1, after "UPDATING" insert -- AUCTION --.

In column 1, line 1, after "UPDATING" insert -- AUCTION --.

In column 1, line 27, after "site" insert -- that --.

In column 15, line 9, in Claim 3, delete "engine" and insert -- engine, --, therefor.

In column 15, line 17, in Claim 3, delete "agent" and insert -- agent, --, therefor.

Signed and Sealed this

Second Day of September, 2008

JON W. DUDAS
*Director of the United States Patent and Trademark Office*